United States Patent
Chopra et al.

(10) Patent No.: US 11,599,352 B2
(45) Date of Patent: Mar. 7, 2023

(54) METHOD OF CREATING AN INTELLIGENT UPGRADE FLOW FOR A HETEROGENEOUS DATA CENTER

(71) Applicant: EMC IP Holding Company LLC, Hopkinton, MA (US)

(72) Inventors: Shelesh Chopra, Bangalore (IN); Hemant Gaikwad, Bangalore (IN); Rahul Deo Vishwakarma, Kolkata (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/386,427

(22) Filed: Jul. 27, 2021

(65) Prior Publication Data
US 2022/0398087 A1    Dec. 15, 2022

(30) Foreign Application Priority Data
Jun. 11, 2021  (IN) .............................. 202141026110

(51) Int. Cl.
*G06F 8/65* (2018.01)
*G06F 16/901* (2019.01)

(52) U.S. Cl.
CPC ............ *G06F 8/65* (2013.01); *G06F 16/9024* (2019.01)

(58) Field of Classification Search
CPC ................................ G06F 8/65; G06F 16/9024
USPC ........................................................ 717/170
See application file for complete search history.

(56) References Cited

U.S. PATENT DOCUMENTS

| | | | |
|---|---|---|---|
| 9,323,644 B1 | 4/2016 | Hale et al. | |
| 9,383,989 B1 * | 7/2016 | Qi | .............................. G06F 8/65 |
| 10,089,585 B1 | 10/2018 | Alexander | |
| 10,817,279 B1 | 10/2020 | Wang et al. | |
| 11,074,064 B1 | 7/2021 | Hm et al. | |
| 11,113,771 B1 * | 9/2021 | Wang | .................. G06F 16/9024 |
| 11,144,438 B1 | 10/2021 | Teixeira | |
| 11,330,078 B1 | 5/2022 | Chopra et al. | |
| 2004/0078778 A1 | 4/2004 | Leymann et al. | |
| 2008/0134145 A1 | 6/2008 | Halcrow | |
| 2012/0259813 A1 | 10/2012 | Takata et al. | |

(Continued)

OTHER PUBLICATIONS

Tsai et al, "Enabling Efficient and Consistent Network Update in Wireless Data Centers". 2019, [Online], pp. 505-520, [Retrieved from internet on Aug. 25, 2022], <https://ieeexplore.ieee.org/stamp/stamp.jsp?arnumber=8642921> (Year: 2019).*

(Continued)

*Primary Examiner* — S. Sough
*Assistant Examiner* — Zengpu Wei
(74) *Attorney, Agent, or Firm* — Chamberlain, Hrdlicka, White, Williams & Aughtry

(57) ABSTRACT

In general, in one aspect, the invention relates to a method for managing updates, the method includes identifying a sub-tree based on a call graph, generating an update sequence for the sub-tree using the call graph, selecting a first component of the sub-tree based on the update sequence, wherein the first component is a hardware resource, applying an update to the first component to obtain a first updated component, selecting, after applying the update to the first component, a second component of the sub-tree based on the update sequence, and performing an update on the second component.

20 Claims, 8 Drawing Sheets

(56) References Cited

U.S. PATENT DOCUMENTS

| | | |
|---|---|---|
| 2014/0013318 A1* | 1/2014 | Rychikhin ................ G06F 8/65 717/172 |
| 2014/0359051 A1 | 12/2014 | Dart et al. |
| 2016/0162819 A1 | 6/2016 | Hakman et al. |
| 2019/0026097 A1 | 1/2019 | Jebbar et al. |
| 2019/0362354 A1 | 11/2019 | Zaslavsky et al. |
| 2020/0057625 A1 | 2/2020 | Livne et al. |
| 2020/0174769 A1 | 6/2020 | Zolotow et al. |
| 2020/0249928 A1 | 8/2020 | Zeng et al. |
| 2020/0278855 A1* | 9/2020 | Nidugala ................ G06F 8/65 |
| 2020/0334026 A1 | 10/2020 | Wang et al. |
| 2021/0049003 A1 | 2/2021 | Trahan et al. |
| 2021/0133076 A1 | 5/2021 | Su et al. |
| 2021/0294800 A1 | 9/2021 | Vishwakarma et al. |
| 2022/0091838 A1 | 3/2022 | Lee et al. |
| 2022/0156053 A1 | 5/2022 | Shaastry et al. |

OTHER PUBLICATIONS

Liu et al, "ZUpdate: Updating Data Center Networks with Zero Loss", 2013, [Online], pp. 411-422, [Retrieved from internet on Sep. 14, 2022], <https://dl.acm.org/doi/pdf/10.1145/2486001.2486005> (Year: 2013).*

Simha etal, "An Update-Aware Storage System for Low-Locality Update-Intensive Workloads", 2012, [Online], pp. 375-386, [Retrieved from internet on Oct. 26, 2022], <https://dl.acm.org/doi/pdf/10.1145/2189750.2151016> (Year: 2012).*

* cited by examiner

METHOD OF CREATING AN INTELLIGENT UPGRADE FLOW FOR A HETEROGENEOUS DATA CENTER

BACKGROUND

Computing devices may provide services. To provide the services, the computing devices may include hardware resources and software components. The hardware and software components may be updated to improve the performance of the aforementioned services. The performance of the services may be important to users and/or other computing devices.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
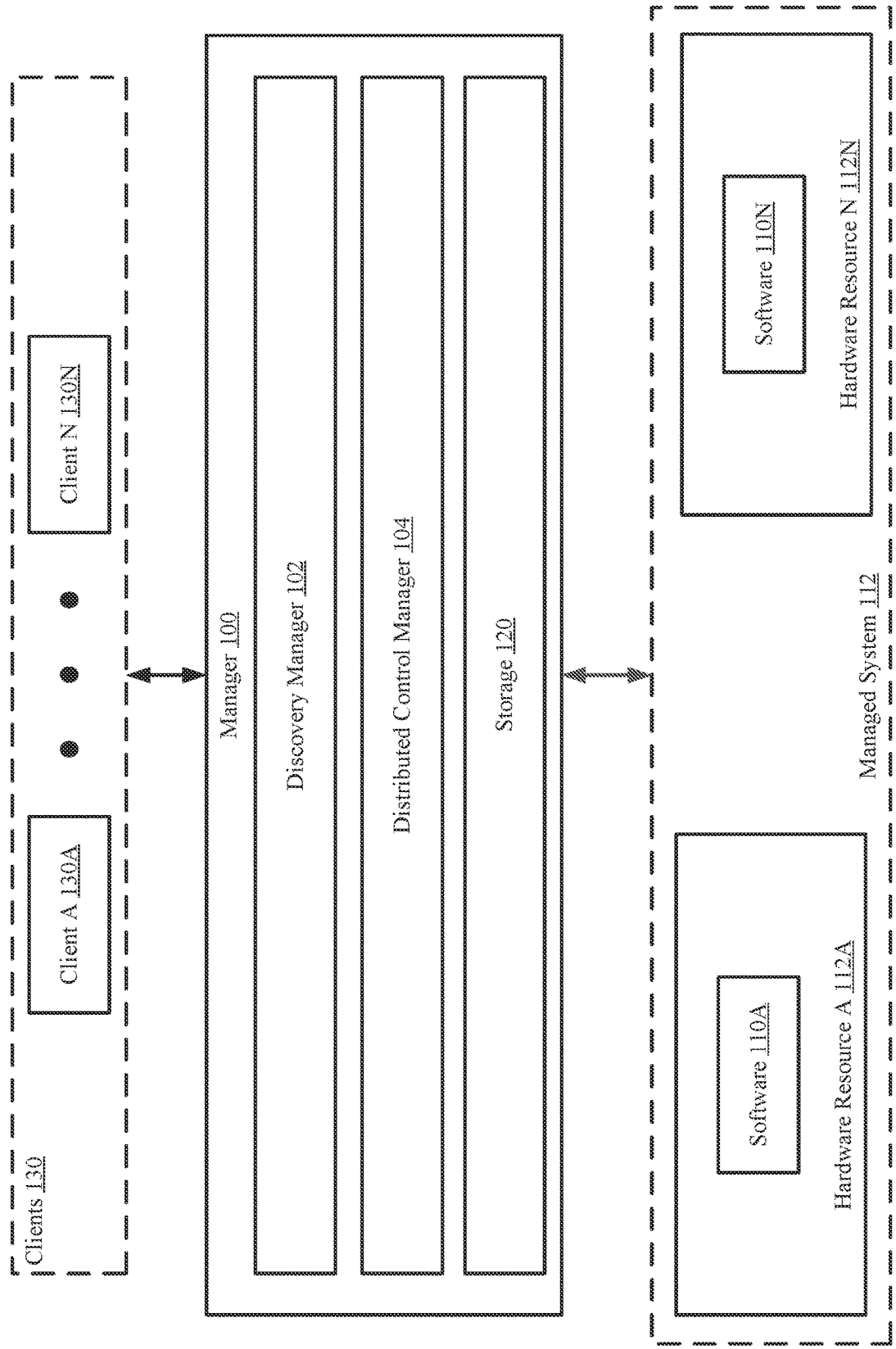
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for managing the update of hardware resources and the software executing thereon (collectively, components). The hardware resources may correspond to components, e.g., in a data center. The hardware resources may be of different types and have different software executing thereon. The software executing on the hardware resources may be software required for the hardware resources to function, e.g., firmware, software required to manage the hardware resources, e.g., hypervisor software, software executing on the hardware to provide services to the clients, and software executing on the hardware to manage the software. The hardware resources may be directly connected (e.g., via wires (or cabling)) or indirectly connected (e.g., via a network infrastructure such as one or more switches or routers).

Further, all or a portion of the hardware resources may be configured to work together, as a system. For example, a system may include the following components: (i) external storage, (ii) a computing device that includes a processor(s) and memory that is connected to the storage; (iii) a hypervisor executing on the computing device, (iv) multiple virtual machines executing on the hypervisor, (v) management software to manage the virtual machines, and (v) software applications executing in the virtual machines. The invention is not limited to this example.

While the above example describes a single system, there may be multiple concurrently executing systems. For example, if the hardware resources are in a data center, then these hardware systems may be may grouped into a set of systems. Depending on the implementation of the data center, the systems may include the same or different sets of hardware resources.

Embodiments of the invention include functionality to manage the updating of components, where the components includes hardware resources and software executing thereon (also referred to as software components) (i.e., the components are heterogeneous). The updating takes into account the relationship between the hardware resources, the relationship between the hardware and software components, and the relationship between the software components.

In one embodiment of the invention, the relationships between the hardware resources are referred to as hardware resource dependencies, the relationships between the hardware resources and the software components are referred to as hardware-software dependencies, and the relationships between the software components are referred to as software dependencies. In one embodiment of the invention, the order of updating the hardware and software components is based on the aforementioned dependencies. Further, in various embodiments of the invention, the hardware resources are updated prior to the updating the software components.

FIG. 1A shows a diagram of a system in accordance with one or more embodiments of the invention. The system may include a manager (100), clients (130), and one or more managed systems (112). The system may include other and/or additional components without departing from the invention.

In one or more embodiments of the invention, the manager (100) includes the functionality to perform management services for the clients (130). The management services may include receiving requests to perform an update of one or more components. The manager (100) may include other and/or additional functionalities without departing from the invention.

Figure 4:
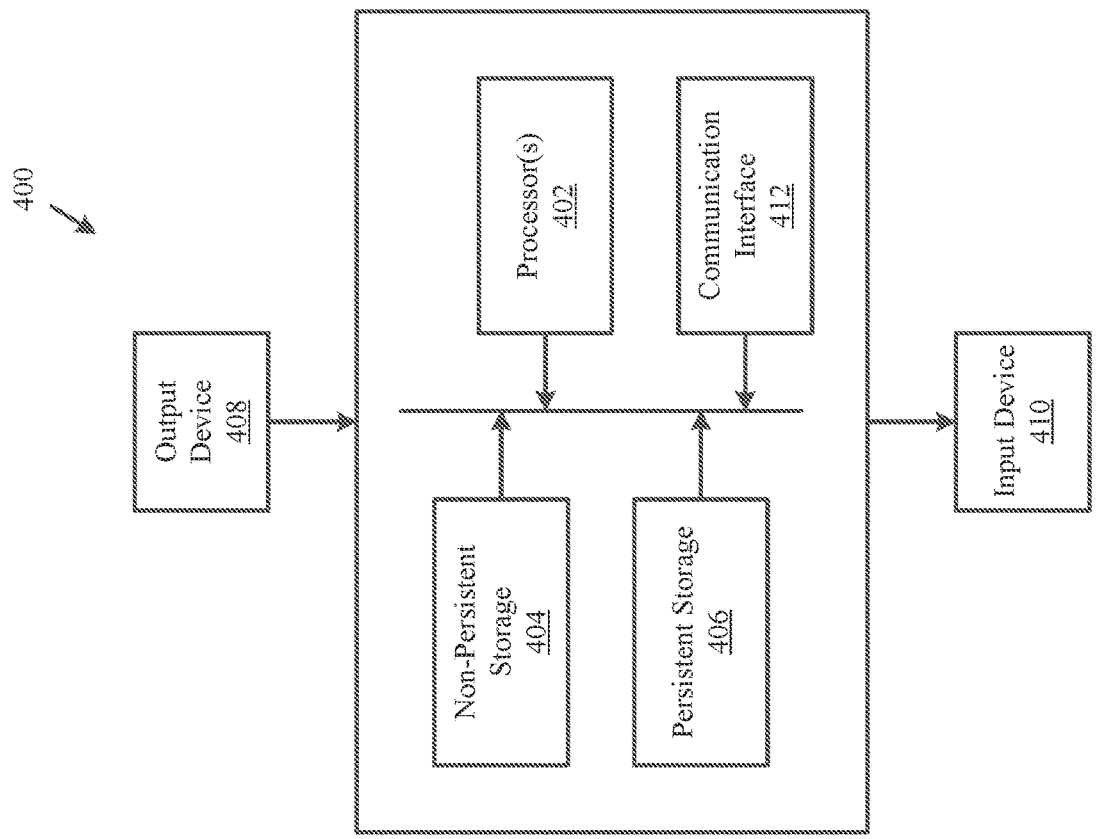
FIG. 4 shows a diagram of a computing device in accordance with one or more embodiments of the invention.

In one or more embodiments of the invention, the manager (100) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the manager (100) described throughout this application.

In one or more embodiments of the invention, the manager (100) is implemented as a logical device. The logical device may utilize the computing resources of any number of computing devices and thereby provide the functionality of the manager (100) described throughout this application.

The manager (100) may include a discovery manager (102). The discovery manager (102) may include the functionality to identify the components the manager (100) is managing (i.e., the managed system (112)). For example, if the manager (100) is managing a data center, then the discovery manager (102) is configured to identify all the components in the data center. The discovery manager (102) may include one or more utilities or other types of software (collectively, referred to as discovery software) to perform the aforementioned discovery functionality. In addition, the discover manager (102) includes functionality to perform the functionality described in FIG. 3A. As a result of the aforementioned functionality, the discovery manager (102) may generate, update, and/or maintain the metadata repository (discussed below). The discovery manager (102) may include other and/or additional functionalities without departing from the invention.

In one or more embodiments of the invention, the discovery manager (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the discovery manager (102) described throughout this application.

In one or more embodiments of the invention, the discovery manager (102) is implemented as computer instructions, e.g., computer code, stored on a persistent storage that when executed by a processor of the manager (100) causes the manager (100) to provide the functionality of the discovery manager (102) described throughout this application.

The manager (100) may include a distributed control manager (104). The distributed control manager (104) may include the functionality to manage updates as discussed in FIGS. 3B-3D. The distributed control manager (104) may include other and/or additional functionalities without departing from the invention.

In one or more embodiments of the invention, the distributed control manager (104) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the distributed control manager (104) described throughout this application.

In one or more embodiments of the invention, the distributed control manager (104) is implemented as computer instructions, e.g., computer code, stored on a persistent storage that when executed by a processor of the manager (100) causes the manager (100) to provide the functionality of the distributed control manager (104) described throughout this application.

In one embodiment of the invention, the storage (120) includes any combination of volatile and/or non-volatile storage media provided by any combination of memory devices (defined below) and/or storage devices (defined below).

In one or more embodiments of the invention, the clients (130) utilize management services provided by the manager (100). The clients (130) may include any number of clients such as client A (130A) and client N (130N).

In one or more embodiments of the invention, a client of the clients (130) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the clients (130) described throughout this application.

In one or more embodiments of the invention, the clients (130) are implemented as a logical device. The logical device may utilize the computing resources of any number of computing devices and thereby provide the functionality of the clients (130) described throughout this application.

Continuing with the discussion of FIG. 1A, the managed system (112) includes any combination of hardware resources (112A, 112N). The hardware resources (112A, 112N) may include and/or be computing resources, special purpose devices, storage resources, and/or networking resources.

The computing resources may include processors. The special purpose devices may include any type and quantity of devices for providing other types of resources. The special purpose devices may include, for example, graphics processing units for providing graphics processing resources, compute accelerators, application specific integrated circuits (ASICs) for performing other functionalities, digital signal processors for facilitating high speed communications, field programmable gate arrays to perform customized computing functionalities, etc. The special purpose devices may include other types of devices for providing other types of resources without departing from the invention.

The storage resources include storage devices and/or memory devices. Storage devices may include any type and quantity of devices for storing data. The devices may include, for example, hard disk drives, solid state drives, tape drives, etc. The storage devices may include other types of devices for providing storage resources without departing from the invention. For example, the storage devices may include controllers (e.g., redundant array of disk controllers), load balancers, and/or other types of devices.

The memory devices may provide memory resources (e.g., transitory and/or persistent storage) to store data including any type and quantity of information. The memory devices may include any type and quantity of devices for storing data. The devices may include, for example, transitory memory such as random access memory, persistent memory such as storage class memory, etc. The memory devices may include other types of devices for providing memory resources without departing from the invention. The networking resources correspond to any resources that may be used to facilitate communication between components of the managed system and/or between components of the managed system and systems external to the managed system. Examples of networking resources include switches, routers, and virtual switches and virtual routers.

The hardware resources (112A, 112N) may include executing thereon one or more software components (also referred to as software (110A, 110N)). The software components may include firmware and/or other software executing on the hardware resources. For example, if the hardware resource is a network switch, then the hardware resource may have the following software components: (i) firmware for the line cards, (ii) a network switch operating system; and (iii) one or more networking applications executing on the network switch operating system. In another example, if the hardware resource is a storage device then the hardware resource may have the following software components: firmware executing on the storage controller of the storage device. In another example, if the hardware resource is a computing device that includes a processor, an ASIC, and memory, then the hardware resource may have the following software components: (i) an operating system executing on the processor; (ii) firmware on the ASIC, (iii) hypervisor software executing on the processor; (iv) one or more virtual machine instances executing on the hypervisor, and (v) one or more applications executing on each of the virtual machines, where the applications may provide services to clients and/or other applications or systems.

The managed system (112) may be a single system or a set of managed systems. Each of the managed systems may include any combination of hardware resources and software components. For example, the managed system (112) may be a data center, where the data center in physically and/or logically divided into smaller managed systems.

Figure 1B:
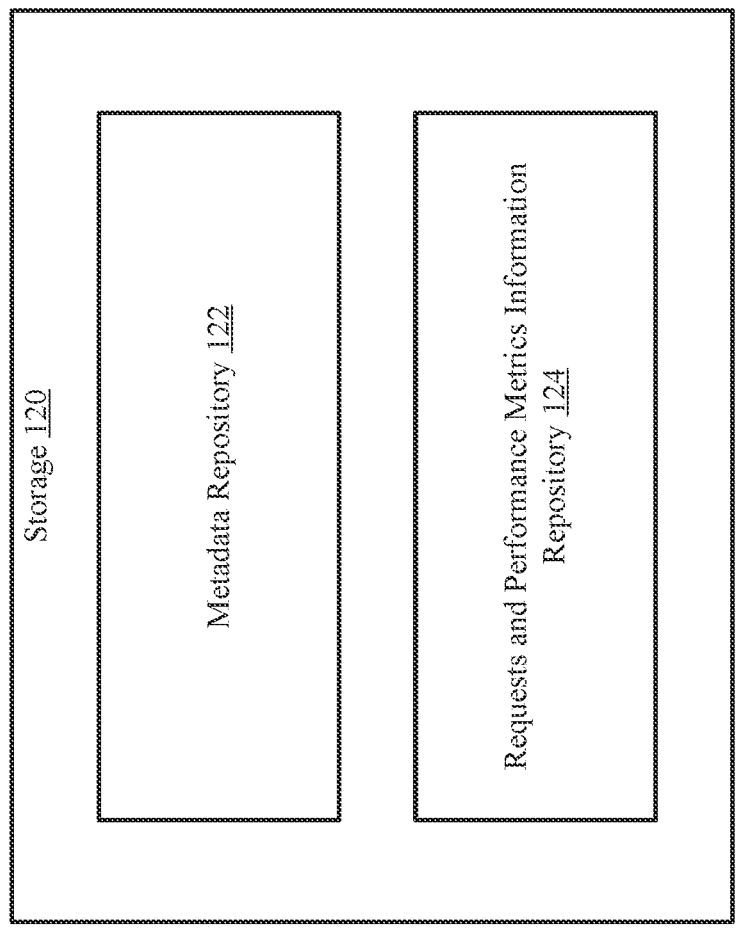
FIG. 1B shows a diagram of a storage in accordance with one or more embodiments of the invention.

FIG. 1B shows a diagram of a storage in accordance with one or more embodiments of the invention. The storage may be an embodiment of the storage (120, FIG. 1A) discussed above. The storage (120) may store data and metadata that may be used by the distributed control manager (104, FIG. 1A) to perform updates of the managed system by the manager (100, FIG. 1A). The storage (120) include a metadata repository (122), and a requests and performance metrics information repository (124). The storage (120) may include other and/or additional data and/or metadata without departing from the invention. Each of the aforementioned components of the storage (120) is discussed below.

In one or more embodiments of the invention, the metadata repository includes information associated with hardware and software components in the managed system as well as data used to perform all or a portion of the functionality in FIGS. 3A-3D. For additional information regarding the metadata repository (122), refer to FIG. 2.

The requests and performance metrics information repository (124) may include one or more data structures that include requests and performance metrics information associated with each of the hardware resources and software components of the managed system. The requests and performance metrics information may include time series data (i.e., when a request was initiated and when it was completed) associated with each request performed by the hardware resources and/or software components of the managed system. The time series data may be generated using monitoring information associated with each request obtained from the distributed control manager (104, FIG. 1A) and/or clients (130, FIG. 1A). The time series data may be used to determine the response completion times and throughput for each request. Additionally, the time series data may be used to predict and update window for a sub-tree. Additionally, the requests and performance metrics information may include performance metrics associated with the hardware resources and/or software components of the managed system. The performance metrics may include, for example, central processing unit (CPU) utilization, memory utilization, and IO performance information associated with the performance of requests. The performance metrics may be used in combination with the time series data to maintain a historical record of the performances of requests by the hardware resources and/or software components of the managed system. This historical record may be used in comparison with the requests and performance metrics information associated with the performance of post-update requests to perform performance and reliability checks on updated the hardware resources and/or software components of the managed system to determine whether updated the hardware resources and/or software components of the managed system are optimally performing requests. The requests and performance metrics information repository (124) may include other and/or additional information without departing from the invention.

Figure 2:
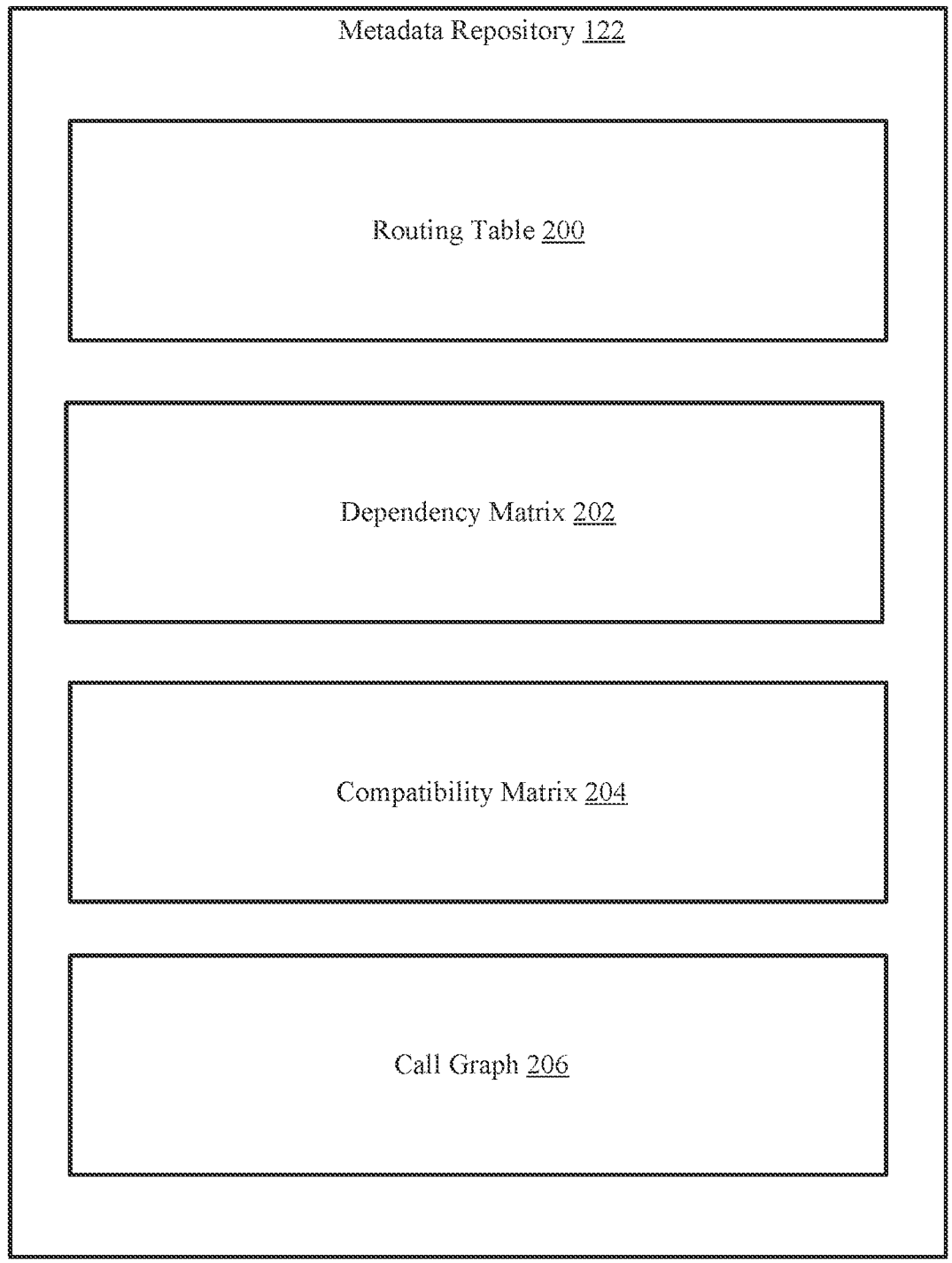
FIG. 2 shows a diagram of a metadata repository in accordance with one or more embodiments of the invention.

FIG. 2 shows a diagram of a metadata repository in accordance with one or more embodiments of the invention. The metadata repository may be an embodiment of the metadata repository (122, FIG. 1B) discussed above. As discussed above, the metadata repository (122) may include information associated with the hardware resources and/or software components of the managed system and may be used by the distributed control manager (104, FIG. 1A) to perform updates of the hardware resources and/or software components of the managed system. The metadata repository (122) may be generated maintained by the discovery manager (102, FIG. 1A) and the distributed control manager (104, FIG. 1A). The metadata repository (122) may include a routing table (200), a dependency matrix (202), a compatibility matrix (204), and a call graph (206). The metadata repository may include other and/or additional information without departing from the invention. Each of the aforementioned components of the metadata repository (122) is discussed below.

The routing table (200) may be one or more data structures that includes component information associated with each component (e.g., the hardware resources and/or software components of the managed system). The component information may include a component identifier, component version, hardware resource identifier associated with the software component executing on the hardware resource, an endpoint uniform resource locator (URL) address and/or a port number associated with the component, a status that depicts whether the component is currently running, and activity flags that denote whether component are active instances or standby instances. The component information may include other and/or additional information without departing from the invention. The routing table (200) may be maintained by the discovery manager (102, FIG. 1A) during a change event and by the distributed control manager (104, FIG. 1A) during an update of the manager (100, FIG. 1A). The routing table (200) may include other and/or additional types of information and may be used for other and/or additional purposes without departing from the invention.

The dependency matrix (202) may be one or more data structures that include dependency information. The dependency information may specify, for each component, which other component that component is dependent upon to perform requests. The dependency information may relate component identifiers to denote the component dependencies. The dependency information may include other and/or additional information without departing from the invention. The dependency matrix (202) may be used to generate the call graph (206). The dependency matrix (202) may be generated using manufactures recommendations, reference architectures for the hardware resources (i.e., an approved organization of hardware resources that is industry standard and/or created and published by a manufacturer or by any other entity), dependency heuristics provided by (or obtained from an external source). The dependency matrix (202) may include other and/or additional types of information without departing from the invention.

The compatibility matrix (204) may be one or more data structures that include compatibility information. The compatibility information may include component identifiers and component versions for each component. The compatibility information may also specify the versions of component in which each component is compatible with. In other words, the compatibility information specifies which versions of the dependent component a particular component may use to perform requests. The compatibility information may be generated using manufactures recommendation of compatibilities and/or using requests and performance metrics information included in the requests and performance metrics information repository (124) (discussed above). The compatibility information may include other and/or additional information without departing from the invention. The compatibility matrix (204) may include other and/or additional types of information without departing from the invention.

The call graph (206) may be one or more data structures that include hierarchical information. The hierarchical information may specify a hierarchical relationship of dependencies between the components of the managed system (or smaller managed systems therein). The hierarchical information may include component identifiers. The call graph (206) may be used to identify sub-trees. Sub-trees may be a unique portion of dependent components in the call graph (206) that do not share components with other sub-trees. For example, consider a scenario in which a data center includes is the managed systems that includes three smaller managed systems, e.g., three racks, where each rack includes storage resources, computing resources, and networking resources. In this example, each rack is its own managed system (i.e., one of the three smaller managed systems) and, as such, may have its own sub-tree.

Continuing with the discussion of FIG. 2, the hierarchical information may include other and/or additional information without departing from the invention. The call graph (206) may include other and/or additional types of information without departing from the invention.

The components in a managed system may be initially discovered using discovery software. Once a given component is discovered, the discovery manager may periodically use the discovery software to identify newly added components and/or to remove from the metadata repository previously identified components that are no longer present. Additionally, or alternatively, the discovery manager may use the method shown in FIG. 3A to discover new components and/or remove components from the metadata repository when previously discovered components are no longer present.

Figure 3A:
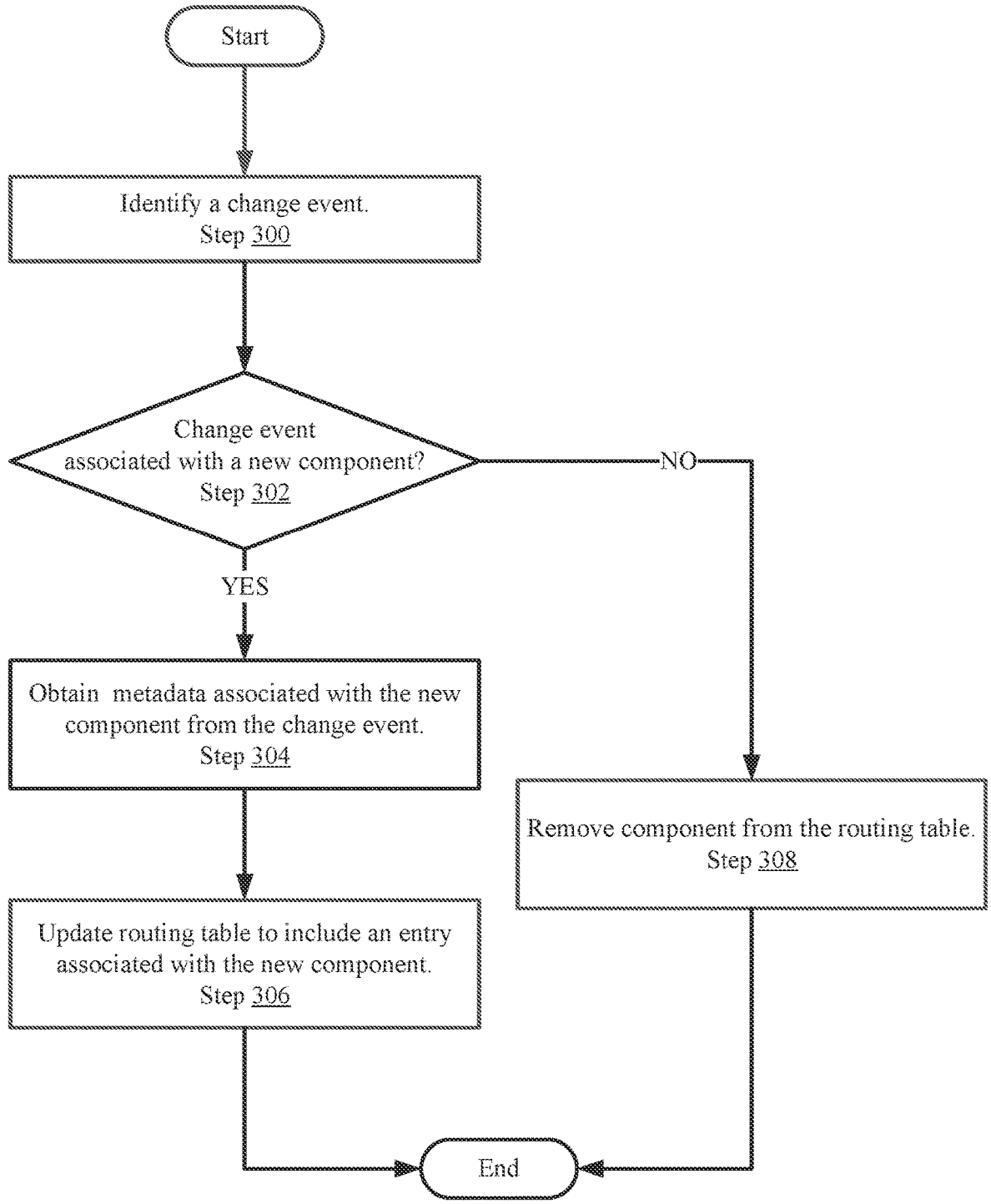
FIG. 3A shows a flowchart of a method for managing change events in accordance with one or more embodiments of the invention.

FIG. 3A shows a flowchart of a method for managing change events in accordance with one or more embodiments of the invention. The method may be performed by, for example, a discovery manager (102) of a manager (100). Other components of the system illustrated in FIG. 1A may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a change event is identified.

In one or more embodiments of the invention, the change event is identified by obtaining a message from a component. The message may include a request to register with the discovery manager. The message may include a component identifier and information that may be used to communicate (i.e., URL address and/or port number) with the component. The message may include other and/or additional information without departing from the invention. The change event may be identified via other and/or additional methods without departing from the invention.

In one or more embodiments of the invention, the discovery manager periodically send messages to the registered components. In response to obtaining the periodic message, a component may respond to the discovery manager with an affirmation message that indicates that the component has not failed, been corrupted, and/or otherwise removed from the manager. The discovery manager may wait for a predetermined amount of time for a response from a component. When the predetermined amount of time has expired following a periodic message, the discovery manager may identify the failure of a component to respond within the predetermined amount of time as the change event. The predetermined amount of time may be any amount of time without departing from the invention. The change event may be identified via other and/or additional methods without departing from the invention.

In one or more embodiments of the invention, registered components send regular messages to the discovery manager. The regular messages may affirm that the components have not failed, been corrupted, and/or otherwise removed from the manager. The discovery manager may monitor the time between receiving the messages associated with each component. The discovery manager may wait a predetermined amount of time between each regular message. When the predetermined amount of time has expired since obtaining the last regular message associated with a component, the discovery manager may identify the failure of a component to send the regular message within the predetermined amount of time as the change event. The predetermined amount of time may be any amount of time without departing from the invention. The change event may be identified via other and/or additional methods without departing from the invention.

In step 302, a determination is made as to whether the change event is associated with a new component.

In one or more embodiments of the invention, the discovery manager determines whether the change event is associated with a new component by either identifying whether the change event is associated with a registration request or a predetermined amount of time has expired before obtaining a response from a component. If the discovery manager identifies the change event as a message that includes a request to register a component (i.e., not an expiration of a predetermined amount of time), then the discovery manager may determine that the change event is associated with a new component. If the discovery manager identifies that the change event is associated with a predetermined amount of time expiring (i.e., not a registration request), then the discovery manager may determine that the change event is not associated with a new component. It may be determined whether the change event is associated with a new component via other and/or additional methods without departing from the invention.

In one or more embodiments of the invention, if it is determined that the change event is associated with a new component, then the method proceeds to step 304. In one or more embodiments of the invention, if it is determined that the change event not associated with a new component, then the method proceeds to step 308.

In step 304, the metadata associated with the new component from the change event is obtained.

In one or more embodiments of the invention, the discovery manager sends a message to the component using the information included in the registration request. The message may include a request for metadata associated with the component. In response to obtaining the message, the component may provide the metadata to the discovery manager. The metadata associated with the new component from the change event may be obtained via other and/or additional methods without departing from the invention.

In step 306, the routing table is updated to include an entry associated with the new component.

In one or more embodiments of the invention, the discovery manager updates the routing table by generating an entry associated with the component. The entry may include the information associated with the component included in the registration request and the metadata associated with the component. The discovery manager may specify the component type associated with the component and the component identifier associated with the active or standby instance of the component in the routing table entry that is associated with the component using the metadata obtained from the component. The entry in the routing table may include other and/or additional information without departing from the invention. The routing table may be updated to include an entry associated with the new component via other and/or additional means without departing from the invention.

In one or more embodiments of the invention, the method ends following step 306.

In step 308, the component is removed from the routing table.

In one or more embodiments of the invention, the discovery manager updates the routing table to remove the component from the routing table. Removing the component from the routing table may indicate that the component is no longer executing on the manager, and as a result, may not be updated and may not be used to perform requests for other components and/or clients. The component may be removed from the routing table via other and/or additional methods without departing from the invention.

In one or more embodiments of the invention, the method ends following step 308.

Figure 3B:
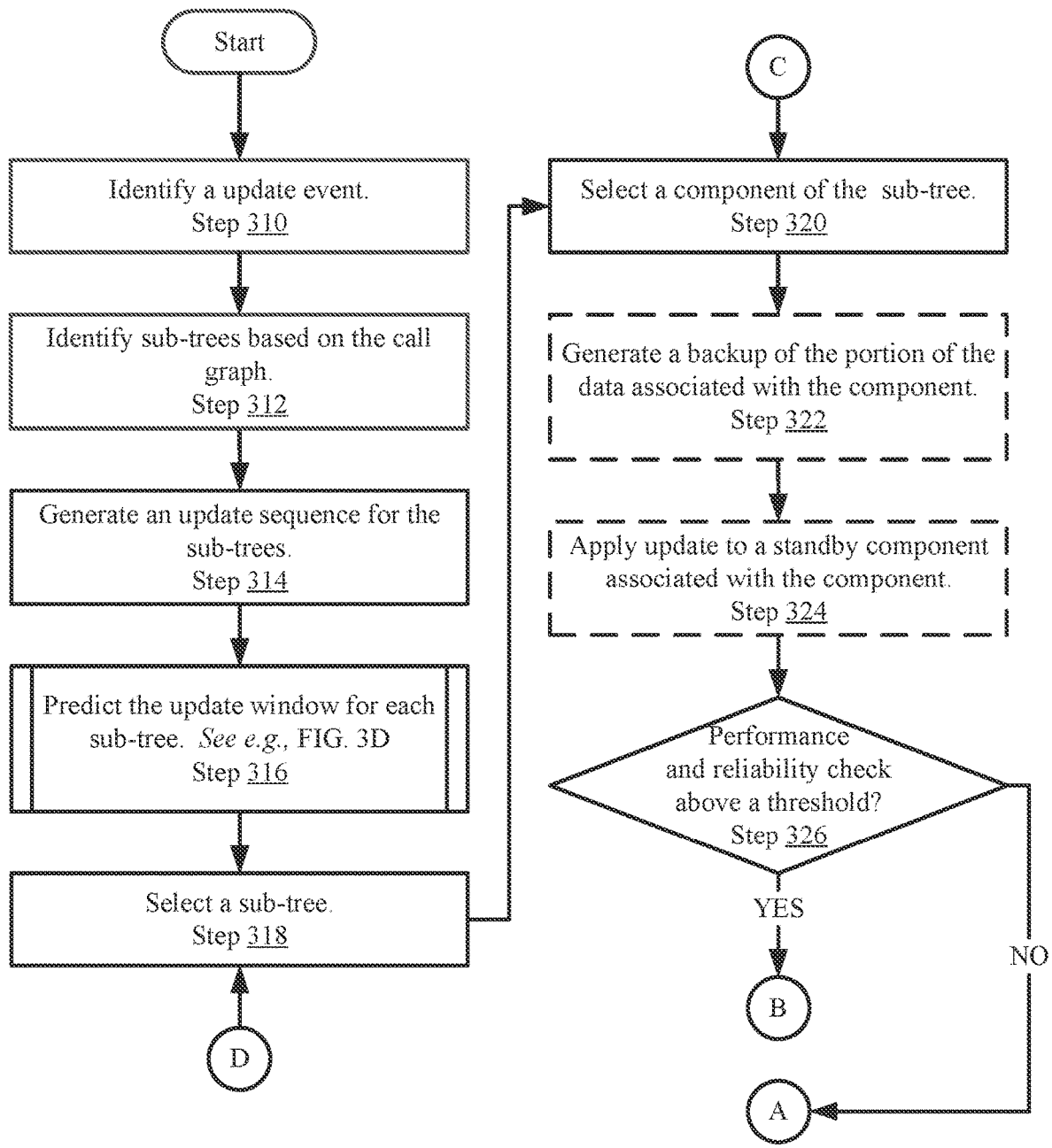
FIGS. 3B-3C show flowcharts of a method for managing updates of a managed system in accordance with one or more embodiments of the invention.
Figure 3C:
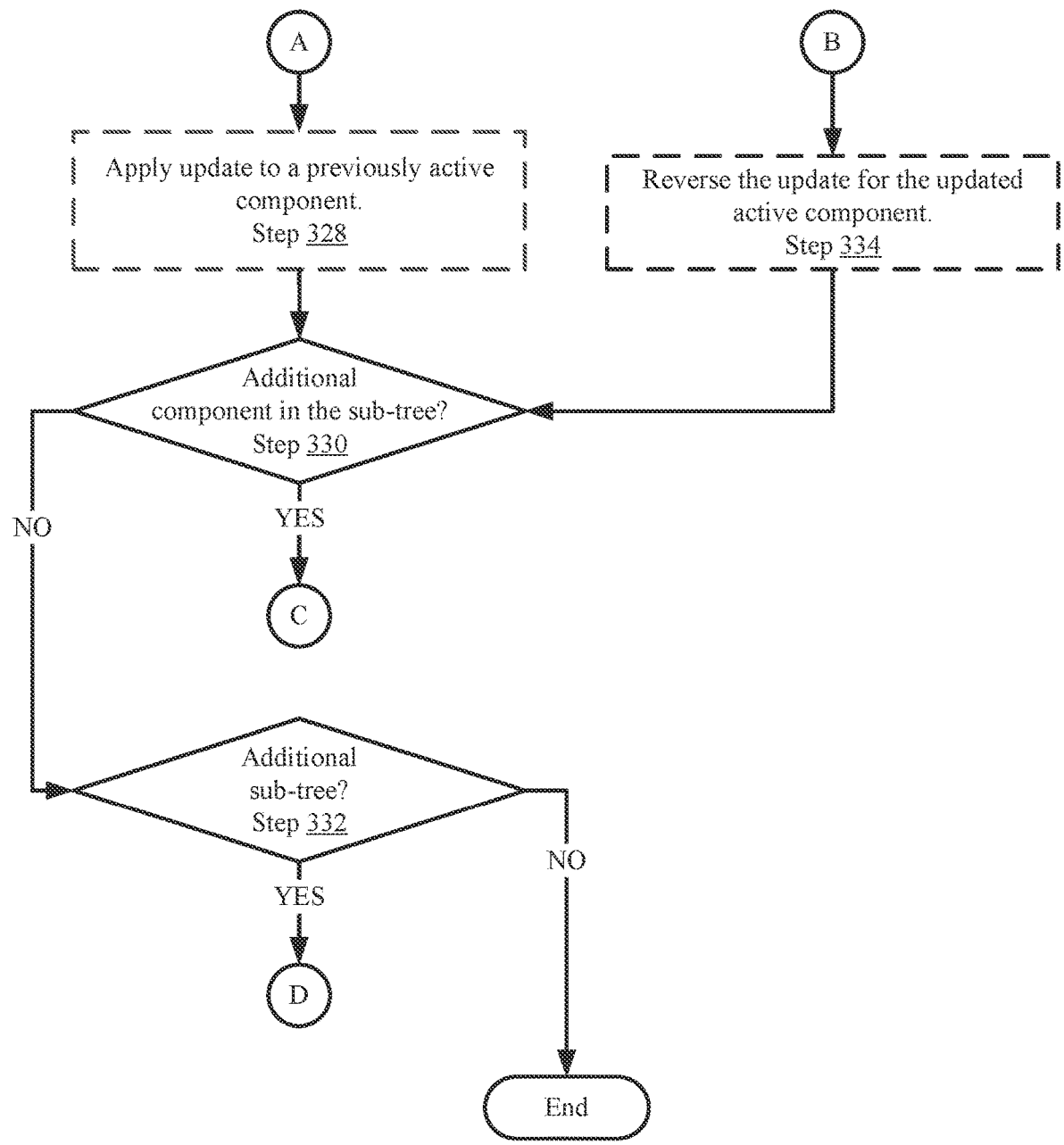

FIGS. 3B-3C show flowcharts of a method for managing updates in accordance with one or more embodiments of the invention. The method may be performed by, for example, a distributed control manager (104) of a manager (100). Other components of the system illustrated in FIG. 1A may perform all, or a portion, of the method of FIGS. 3B-3C without departing from the invention.

While FIGS. 3B-3C are illustrated as a series of steps, any of the steps may be omitted, performed in a different order, additional steps may be included, and/or any or all of the steps may be performed in a parallel and/or partially overlapping manner without departing from the invention.

In step 310, an update event is identified.

In one or more embodiments of the invention, a user of the manager or an entity that manages updates of the managed system (not shown) sends a message to the distributed control manager. The message may include a request to perform an update. The update may be associated with any number of components executing on the managed system. The message may specify the components associated with the update (i.e., include component identifiers associated with components to be updated). The message may include the updates to the components. The updates may include computer instructions, that when executed by the components, result in the instantiation of an updated component when the component is a software component or result in the rebooting of a hardware resource after the firmware on the hardware resource has been updated. The message may include other and/or additional information and/or data without departing from the invention. The distributed control manager may identify obtaining the message as the update event. The update event may be identified via other and/or additional methods without departing from the invention.

In step 312, sub-trees are identified based on a call graph.

In one or more embodiments of the invention, the distributed control manager uses the call graph to identify sub-trees that include the components to be updated based on the update event. As discussed above, the call graph specifies the hierarchical relationship of the dependencies of the components executing in the managed system. The distributed control manager may identify the components associated with the update request included in the call graph. The distributed control manager may then identify sub-trees using the call graph and the identified component. The distributed control graph may identify a portion of the identified components that are uniquely dependent on or depended by only other components in the portion of the identified components as a sub-tree. In other words, the components in a sub-tree may share a unique dependency not found in other sub-trees. The distributed control manager may identify any number of sub-trees without departing from the invention. The sub-trees may be located at any portion of the call graph without departing from the invention. Sub-trees may be identified based on the call graph via other and/or additional methods without departing from the invention.

In step 314, an update sequence for the sub-trees is generated.

In one or more embodiments of the invention, the distributed control manager identifies the update sequence for the sub-trees based on each sub-trees position in the call graph. The distributed control manager may assign each sub-tree a position in the update sequence based on the position of each sub-tree in the call graph. The update sequence may specify an order of sub-trees and components included in the sub-trees to update. The update sequence may include an ordered list of sub-tree identifiers and an ordered list of components identifiers. The distributed control manager may assign sub-trees located at a lower portion of the call graph higher in the update sequence than sub-trees located at a higher portion of the call graph. In other words, a sub-tree positioned at the lowest part of the call graph may be assigned a higher update sequence position and be updated prior to a sub-tree at a higher part of the call graph. Each components of a sub-tree may be updated sequentially from the top component of the sub-tree to the bottom components of the sub-tree based on the call graph. The update sequence for the sub-trees may be generated using other and/or additional methods without departing from the invention.

EXAMPLE

The following is a non-limiting example of a sub-tree that takes into account the dependencies between hardware resources, dependencies between hardware resources and software components, and dependencies between software components.

Turning to the example, consider a scenario in which the managed system includes external storage (with a storage controller), a computing device that includes a processor and memory and operatively connected to the external storage, a hypervisor executing on the computing device, a virtual machine manager executing on the hypervisor, a system management application executing in a virtual machine on the hypervisor.

In this example, the hardware resources are updated prior to updating any of the software components. Accordingly, all of the software components may be considered dependent on the hardware resources.

Accordingly, the firmware on the storage controller needs to be updated first. Once the firmware is updated, the software components on the computing device can be update. In this example, the systems management application is dependent on a virtual machine executing on a virtual machine, the virtual machine execution is dependent on the execution of a virtual machine manager, and the virtual machine manager and the virtual machine are both dependent on the execution of hypervisor. Accordingly, the hypervisor is updated, following by the virtual machine manager, followed by the systems management application.

The resulting call graph is as follows: firmware on the storage controller→hypervisor→virtual machine manager-→systems management application.

End of Example

Continuing with the discussion of FIG. 3B, in step 316, the update window for each sub-tree is predicted. In one or more embodiments of the invention, the distributed control manager uses the requests and performance metrics information repository to predict the update window for each sub-tree. An update window is a period of time in which the number of and/or requirements for requests submitted to the components of a sub-tree are negligible and is therefore optimal for performing updates. For additional information regarding predicting the update window for a sub-tree, refer to FIG. 3D.

In step 318, a sub-tree is selected.

In one or more embodiments of the invention, the distributed control manager selects the highest positioned sub-tree in the update sequence that has not been previously selected. As discussed above, the update sequence specifies an order for apply updates to the sub-trees and the components included in the sub-trees associated with the update event. After selecting a sub-tree, the distributed control manager may tag the update sequence and/or remove the sub-tree identifier included in the update sequence to indicate that the sub-tree has been selected so as to not select a previously selected sub-tree. A sub-tree may be selected via other and/or additional methods without departing from the invention.

In step 320, a component of the sub-tree is selected.

In one or more embodiments of the invention, the distributed control manager selects the highest positioned component in the sub-tree that has not been previously selected. After selecting a component of the sub-tree, the distributed control manager may tag the sub-tree and/or remove the component identifier included in the sub-tree to indicate that the component has been selected so as to not select a previously selected component. A component may be selected via other and/or additional methods without departing from the invention.

In step 322, a backup of a portion of the shared data volume repository associated with the component is generated. Step 322 may be optionally performed when the component is a software component.

In one or more embodiments of the invention, the distributed control manager generates a backup of the data associated with the component. The distributed control manager may use any backup generation techniques without departing from the invention. The distributed control manager may generate two backup copies of the data associated with the component, where each copy is stored in a storage device(s) in a separate independent fault domain for data protection purposes. The backup copies may be used during the update and/or to restore an updated component that is not performing as expected to its previous state prior to the update. The backup of the portion of the data associated with the component may be generated via other and/or additional methods without departing from the invention.

In step 324, an update is applied to a standby component associated with the component. Step 324 may be performed in scenarios in which the component is a software component and there is another corresponding software component (i.e., a standby instance of the software component).

In one or more embodiments of the invention, the distributed control manager applies the update to the standby component associated with the component. An active component may be associated with at least one standby component. The active component may be performing requests while the standby component may not be performing requests. The distributed control manager may initiate the instantiation of the updated standby component using at least a portion of computer instructions included in the update request. As a result, the standby component may be updated. Following the update of the standby component, the distributed control manager may switch the active and standby status of the updated standby component and the active component in the routing table. Accordingly, the updated standby component may be switched to an updated active component and may begin to service requests. The distributed control manager may monitor the time it takes to update the standby component and store that information in the requests and performance metrics information repository. The update may be applied to the standby component via other and/or additional methods without departing from the invention.

In one or more embodiments of the invention, the update may be applied by the distributed control manager to each component in the sub-tree via the methods discussed above in steps 320, 322, and 324 prior to proceeding to step 326.

In step 326, a determination is made as to whether a performance and reliability check is above a threshold.

In one or more embodiments of the invention, the distributed control manager monitors the performance of requests of the updated active component. The monitoring may include obtaining requests and performance metrics information associated with the updated active component. The monitoring of the updated active component may be performed for a configurable amount of time and/or requests until the performance and reliability check is performed without departing from the invention. The performance and reliability check may include comparing requests and performance metrics information following the update of the updated active component with the requests and performance metrics information of the active component prior to the update.

If the comparison made during the performance and reliability check indicates that the performance of the updated active component is above a configurable error threshold, then the distributed control manager may determine that the performance and reliability check is above a threshold. If the comparison made during the performance and reliability check indicates that the performance of the updated active component is not above a configurable error threshold, then the distributed control manager may determine that the performance and reliability check is not above a threshold. The determination as to whether a performance and reliability check is above a threshold may be made via other and/or additional methods without departing from the invention.

In one or more embodiments of the invention, if it is determined that the performance and reliability check is above a threshold, then the method proceeds to step 334. In one or more embodiments of the invention, if it is determined that the performance and reliability check is not above a threshold, then the method proceeds to step 328.

In one or more embodiments of the invention, the distributed control manager may determine whether a performance and reliability check is above a threshold for all of the updated components in the sub-tree via the methods discussed above in step 326 prior to proceeding to steps 328 or 334. If it is determined that a performance and reliability check associated with one of the components of the sub-tree is above a threshold, then the method may proceed to step 334. If it is determined that no performance and reliability check associated with any of the components of the sub-tree are above a threshold, then the method may proceed to step 328.

In step 328, the update is applied to a previously active component.

In one or more embodiments of the invention, the distributed control manager applies the update to the standby component (i.e., which was previously the active component). The distributed control manager may initiate the instantiation of the updated standby component using at least a portion of computer instructions included in the update request. As a result, the standby component may be updated. The distributed control manager may monitor the time it takes to update the previously active component and store that information in the requests and performance metrics information repository. The update may be applied to the standby component (i.e., which was previously the active component) via other and/or additional methods without departing from the invention.

In one or more embodiments of the invention, the update may be applied to all previously active component in the sub-tree via the methods discussed above in step 328 prior to proceeding to step 330.

In step 330, a determination is made as to whether there is an additional component in the sub-tree.

In one or more embodiments of the invention, the distributed control manager uses the update sequence to determine whether there is an additional component in the sub-tree. The update sequence may include a list of component identifiers associated with the components included in each sub-tree. As discussed above, the distributed control manager may tag the update sequence and/or may remove the component identifiers associated with previously selected components of the sub-tree to indicate which components were previously selected. If the distributed control manager identifies an identifier associated with a component of the sub-tree included in the update sequence that is not associated with a tag, then the distributed control manager may determine that there is an additional component in the sub-tree. If the distributed control manager does not identify an identifier associated with a component of the sub-tree included in the update sequence that is also not associated with a tag, then the distributed control manager may determine that there is not an additional component in the sub-tree. The determination as to whether there is an additional component in the sub-tree may be made via other and/or additional methods without departing from the invention.

In one or more embodiments of the invention, if it is determined that there is an additional component in the sub-tree, then the method proceeds to step 320. In one or more embodiments of the invention, if it is determined that there is not an additional component in the sub-tree, then the method proceeds to step 332.

In step 332, a determination is made as to whether there is an additional sub-tree.

In one or more embodiments of the invention, the distributed control manager uses the update sequence to determine whether there is an additional sub-trees associated with the update event. The update sequence may include a list of sub-tree identifiers associated with each sub-tree. As discussed above, the distributed control manager may tag the update sequence and/or may remove the sub-tree identifiers associated with previously selected sub-trees to indicate which sub-trees were previously selected. If the distributed control manager identifies an identifier associated with a sub-tree included in the update sequence that is not associated with a tag, then the distributed control manager may determine that there is an additional sub-tree. If the distributed control manager does not identify an identifier associated with a sub-tree included in the update sequence that is also not associated with a tag, then the distributed control manager may determine that there is not an additional sub-tree. The determination as to whether there is an additional component in the sub-tree may be made via other and/or additional methods without departing from the invention.

In one or more embodiments of the invention, if it is determined that there is an additional sub-tree, then the method proceeds to step 318. In one or more embodiments of the invention, if it is determined that there is not an additional sub-tree, then the method ends following step 332.

In step 334, the update for the updated active component is reversed.

In one or more embodiments of the invention, the distributed control manager reverses the update to the updated active component using the backup of the component generated prior to updating the active component. The distributed control manager may switch the active and standby status of the updated active component and the standby component. As a result the updated active component may be switched to the updated standby component and the standby component, which is has not been updated, may be switched to the active component. Accordingly, the active component may begin servicing requests. The distributed control manager may obtain one of the two backup copies associated with the active component and use the backup copy to initiate the restoration of the updated standby component to instantiate the standby component to the state of the standby component prior to the update.

In one or more embodiments of the invention, following step 334, the method may proceed to step 330. In one or more embodiments of the invention, the update for all updated active components of the sub-tree may be reversed via the methods discussed above in step 334 prior to proceeding to step 330. The distributed control manager may reverse the updates of all components in the sub-tree to maintain compatibility between the components in the sub-tree.

While FIGS. 3B-3C discuss updating in the context of an active component and a corresponding standby component, embodiments of the invention may be implemented in scenarios in which there is no standby component for a given active component in the managed system; rather, there is only one such component in the managed system. In this scenario, the updating of the component involves performing step 322 (optionally), step 324 (to update the component as opposed to updating a standby component), and step 334 (rolling back an update of the component as necessary per Step 326). In scenarios in which there is only the active component, the active component may be temporarily unavailable while it is being updated and there is no switching of role from standby to active (or vice versa). In a given sub-tree there may be zero, one, or more active components that have a corresponding standby component and zero, one or more active components that do not have a corresponding standby component.

Figure 3D:
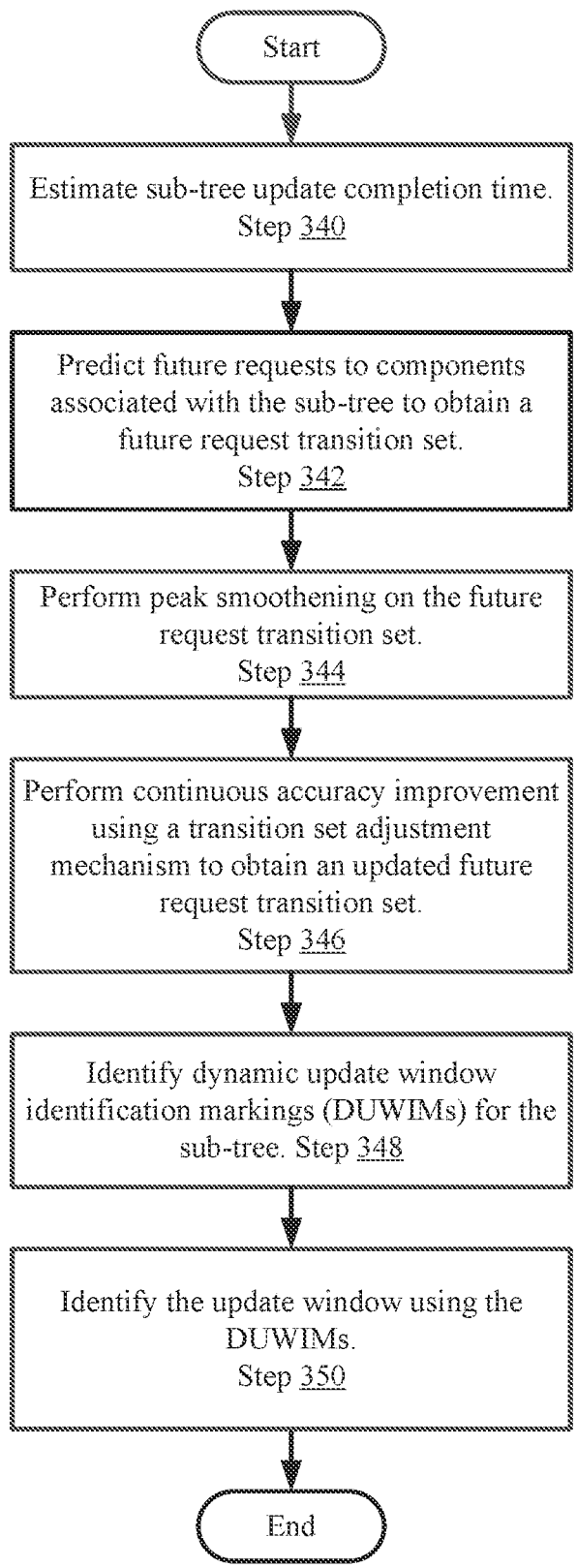
FIG. 3D shows a flowchart of a method for predicting an update window in accordance with one or more embodiments of the invention.

FIG. 3D shows a flowchart of a method for predicting an update window in accordance with one or more embodiments of the invention. The method may be performed by, for example, a distributed control manager (104) of a manager (100). Other components of the system illustrated in FIG. 1A may perform all, or a portion, of the method of FIG. 3D without departing from the invention.

While FIG. 3D is illustrated as a series of steps, any of the steps may be omitted, performed in a different order, additional steps may be included, and/or any or all of the steps may be performed in a parallel and/or partially overlapping manner without departing from the invention.

In step 340, the sub-tree update completion time is estimated.

In one or more embodiments of the invention, the distributed control manager uses a random forest regression algorithm to generate an estimation of the update completion time for the sub-tree. The distributed control manager may obtain from the requests and performance metrics information repository the actual update completion times for previous updates associated with each component in the sub-tree. The distributed control manager may then calculate the overall update completion times of the sub-tree based on the previous updated completion times of each component. The distributed control manager may then apply a random forest regression model to the overall update completion times to generate an estimation of the update completion time. The distributed control manager may apply any type of prediction model capable of generating such predictions without departing from the invention.

The distributed control manager may add a configurable buffer percentage of time to the estimated update completion time to obtain the final estimated updated completion time. The configurable buffer percentage of time may be a percentage of the estimated update completion time output by the random forest regression model. The configurable buffer percentage of time may be added to ensure enough time is included in the estimation to perform performance and reliability checks associated with the updated components of the sub-tree. Additionally, the configurable buffer percentage time may be added to ensure estimated update window in not a period of time that is shorter than the actual update window. The sub-tree update completion time may be estimated via other and/or additional methods without departing from the invention.

In step 342, the future requests for components associated with the sub-tree are predicted to obtain a future request density transition set.

In one or more embodiments of the invention, the distributed control manager uses the requests and performance metrics information associated with requests serviced by the components of the sub-tree included in the requests and performance metrics information repository to obtain the future requests transition set. The distributed control manager may use the requests and performance metrics information to generate time series data. The time series data may include requests and performance metrics information that are associated with points in time. The distributed control manager may classify the time series data based on request types (e.g., read requests, writes requests) and where the requests originated from (i.e., internal requests from other components of the manager or external requests from other entities such as the clients) to determine which request may be allowed and/or restricted during the performance of the update. In addition to the requests and performance metrics information associated with past requests serviced by the components of the sub-tree, the times series data may also include the utilization information included in the requests and performance metrics information repository associated with hardware resources of the manager.

The distributed control manager may apply the time series data to a probabilistic weighted fuzzy times series model to obtain the prediction of the future request density transition set for each component in the sub-tree. The distributed control manager may apply any other prediction model capable of generating predictions of the number of future requests for each component without departing from the invention. The future requests transition set may include predictions for the number of requests sent to each component at future points in time. The future requests transition set may also include predictions of future utilization information at future points in time. The future requests transitions set may be associated with a configurable number of future points in time. The future requests for components associated with the sub-tree may be predicted to obtain a future request density transition set via other and/or additional methods without departing from the invention.

In step 344, peak smoothening is performed on the future requests transition set.

In one or more embodiments of the invention, the distributed control manager may perform peak smoothing on the future requests transition set to obtain a smoothed updated future requests transition set. The future requests transitions sets may include points in time associated with a number of requests and/or utilization information that is significantly higher than that of the previous point in time and the subsequent point in time. The distributed control manager may identify these points in time as peaks. If the peaks (i.e., the number of requests and/or utilization information) are above a configurable percentage of the neighboring points in time, the distributed control manager may remove the peaks from the future requests transition set to smooth the future requests transition set to stabilize the future requests transition set. Peak smoothening may be performed on the future requests transition set via other and/or additional methods without departing from the invention.

In step 346, continuous accuracy improvement is performed on the future request density transition set to obtain an updated future request density transition set.

In one or more embodiments of the invention, the distributed control manager performs continuous accuracy improvement on the future request density transition set using the real time monitoring updates of the requests and performance metrics information repository. The distributed control manager may compare the future request density transition set to the number of requests for the components of the sub-tree included in the requests and performance metrics information repository for a portion of the future points in time included in the future requests transition set as they occur in real time. If the predicted values and the real monitored values are different by a configurable percentage, the distributed control manager may update the future requests transition set. Continuous accuracy improvement may be performed on the future request density transition set to obtain an updated future request density transition set via other and/or additional methods without departing from the invention.

In step 348, dynamic update window identification markings (DUWIMs) for the sub-tree are identified.

In one or more embodiments of the invention, the distributed control manager uses the updated future request density transition set to identify DUWIMs for the sub-tree. The distributed control manager may divide the future requests transition set into periods of time spanning the entirety of the future requests transition set. The distributed control manager may divide the future requests set into any number of periods of time of any length in time without departing from the invention. For each period of time, the distributed control manager may determine whether the request density for each component is associated with a high usage, a medium usage, and/or a low usage. The request density may refer to the number of requests per component of the sub-tree. Low usage may refer to a request density between zero and ten percent, medium usage may refer to a request density between ten and fifty percent, and high usage may refer to a request density between fifty and one hundred percent.

The distributed control manager may use a different level of granularity of levels of use and divisions of requests density associated with each level of use without departing from the invention. The distributed control manager may assign a DUWIM of 1 to all time periods associated with a low usage, and may assign a DUWIM of 0 to all time periods associated with a medium or high usage. The distributed control manager may update the DUWIMs based on the continuous accuracy improvements made over time in step 346. The DUWIMs may be identified for the sub-tree via other and/or additional methods without departing from the invention.

In step 350, the update window is identified using the DUWIMs.

In one or more embodiments of the invention, the distributed control manager uses the DUWIMs and the estimated sub-tree completion time to identify the update window. The distributed control manager may identify consecutive periods of time associated with DUWIMs of 1 that coincide with a greater or equal amount of time than the estimated sub-tree completion time as the update window. The update window may be identified using the DUWIMs via other and/or additional methods without departing from the invention.

The method may end following step 350.

As discussed above, embodiments of the invention may be implemented using computing devices. 4 FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the performance of updates for heterogeneous managed system. More specifically, embodiments of the invention relate to updating components in a manner that minimizes the downtime.

Thus, embodiments of the invention may address the problem of inefficient use of computing resources to perform updates of a manager in a system. This problem arises due to the technological nature of the environment in which the manager operates.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing updates, the method comprising:
   identifying a sub-tree based on a call graph;
   generating an update sequence for the sub-tree using the call graph;
   selecting a first component of the sub-tree based on the update sequence, wherein the first component is a hardware resource;
   applying an update to the first component to obtain a first updated component;
   selecting, after applying the update to the first component, a second component of the sub-tree based on the update sequence; and
   performing an update on the second component.

2. The method of claim 1, wherein the call graph specifies a hierarchical relationship between the first component and the second component.

3. The method of claim 1, wherein the hardware resource is a storage device and wherein applying the update to the first component comprises updating firmware on a controller of the storage device.

4. The method of claim 3, wherein the second component is a software component executing on a computing device operatively connected to the first component.

5. The method of claim 1, wherein the update sequence specifies an order in which components of the sub-tree are to be updated.

6. The method of claim 1,
   wherein the second component is associated with a standby component; and
   wherein performing the update of the second component comprises:
      generating a backup of data volume associated with the standby component;
      applying an update to the standby component to obtain an active component;
      making a check to determine that a performance and reliability associated with the active component is below a threshold; and
      in response to the determination:
         initiating updating of the second component, wherein the second component is transitioned to a role of standby.

7. The method of claim 1, wherein at least a portion of the call graph is derived using a reference architecture.

8. A non-transitory computer readable medium comprising computer readable program code, which when executed by a computer processor enables the computer processor to perform a method for managing updates, the method comprising:
   identifying a sub-tree based on a call graph;
   generating an update sequence for the sub-tree using the call graph;
   selecting a first component of the sub-tree based on the update sequence, wherein the first component is a hardware resource;
   applying an update to the first component to obtain a first updated component;
   selecting, after applying the update to the first component, a second component of the sub-tree based on the update sequence; and
   performing an update on the second component.

9. The non-transitory computer readable medium of claim 8, wherein the call graph specifies a hierarchical relationship between the first component and the second component.

10. The non-transitory computer readable medium of claim 8, wherein the hardware resource is a storage device and wherein applying the update to the first component comprises updating firmware on a controller of the storage device.

11. The non-transitory computer readable medium of claim 10, wherein the second component is a software component executing on a computing device operatively connected to the first component.

12. The non-transitory computer readable medium of claim 8, wherein the update sequence specifies an order in which components of the sub-tree are to be updated.

13. The non-transitory computer readable medium of claim 8,
   wherein the second component is associated with a standby component;
   wherein performing the update of the second component comprises:
      generating a backup of data volume associated with the standby component;
      applying an update to the standby component to obtain an active component;
      making a check to determine that a performance and reliability associated with the active component is below a threshold; and
      in response to the determination, initiating updating of the second component, wherein the second component is transitioned to a role of standby.

14. The non-transitory computer readable medium of claim 8, wherein at least a portion of the call graph is derived using a reference architecture.

15. A system for managing updates, the system comprising:
   a managed system comprising components;
   a distributed control manager, comprising a processor and memory, configured to:
      identify a sub-tree based on a call graph;
      generate an update sequence for the sub-tree using the call graph;
      select a first component of the sub-tree based on the update sequence, wherein the first component is a hardware resource, wherein the first component is one of the components;
      apply an update to the first component to obtain a first updated component;
      select, after applying the update to the first component, a second component of the sub-tree based on the update sequence, wherein the second component is another one of the components; and perform an update on the second component.

16. The system of claim 15, wherein the call graph specifies a hierarchical relationship between the first component and the second component.

17. The system of claim 15, wherein the hardware resource is a storage device and wherein applying the update to the first component comprises updating firmware on a controller of the storage device.

18. The system of claim 17, wherein the second component is a software component executing on a computing device operatively connected to the first component.

19. The system of claim 15, wherein the update sequence specifies an order in which components of the sub-tree are to be updated.

20. The system of claim 15, wherein at least a portion of the call graph is derived using a reference architecture.

* * * * *